March 23, 1954
E. W. ALLARDT
2,673,276
POST HEATING OF ELECTRICALLY WELDED
TUBES IN LINE OF PRODUCTION
Filed Feb. 1, 1951
3 Sheets-Sheet 1
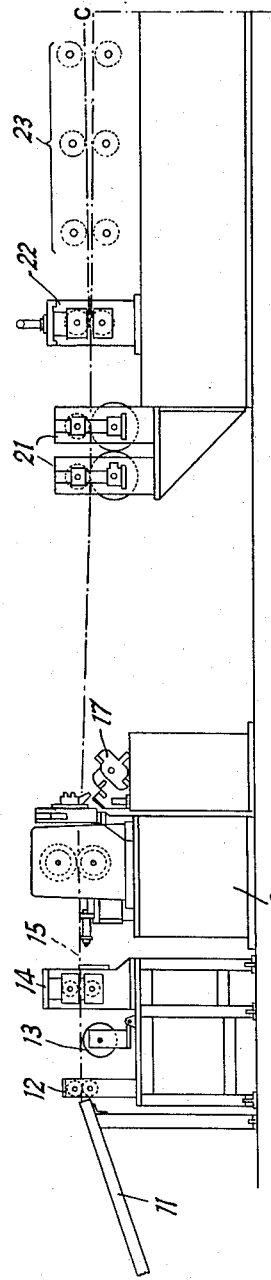
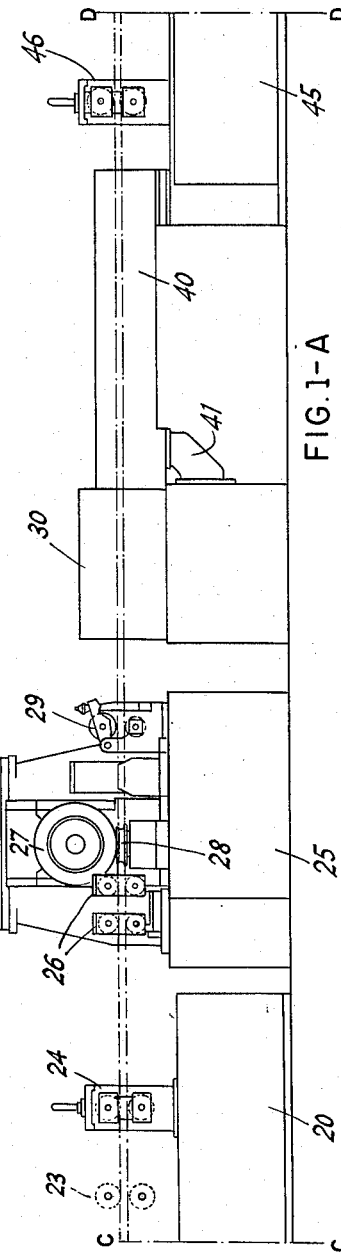
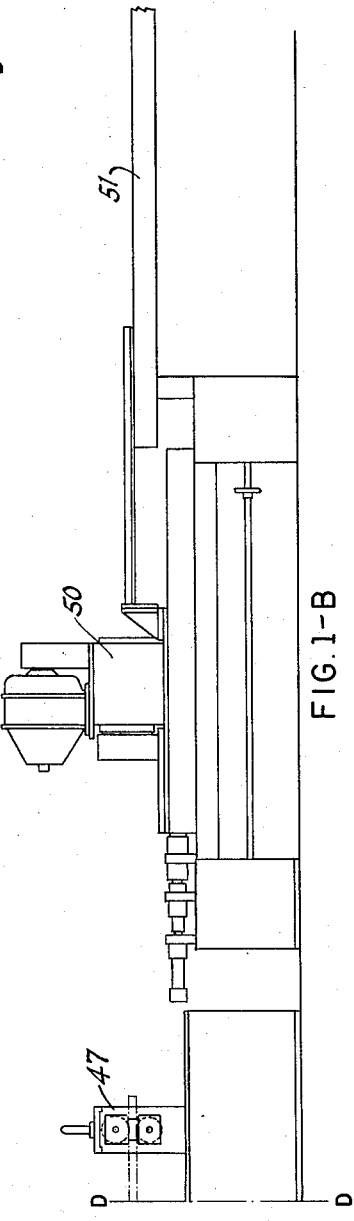
INVENTOR
Ernst W. Allardt
BY
J. P. Moran
ATTORNEY

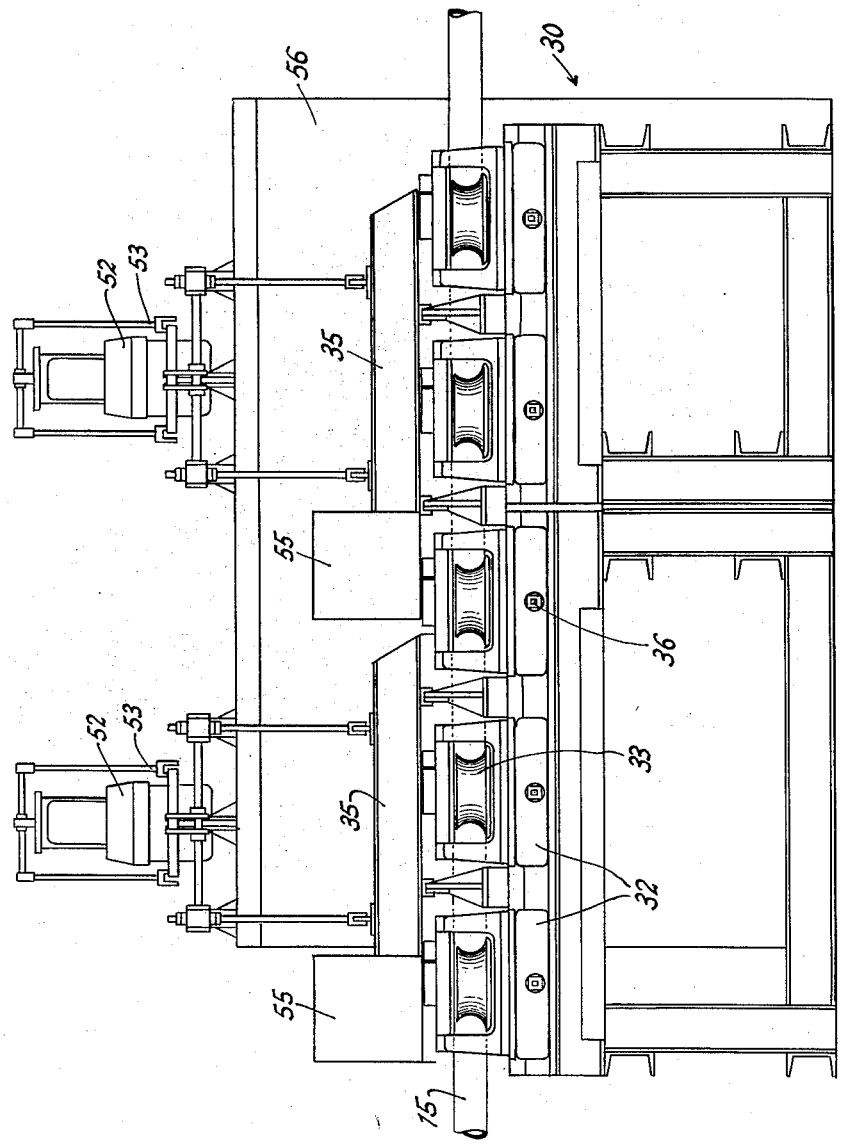

March 23, 1954 E. W. ALLARDT 2,673,276
POST HEATING OF ELECTRICALLY WELDED
TUBES IN LINE OF PRODUCTION
Filed Feb. 1, 1951 3 Sheets-Sheet 3

INVENTOR
Ernst W. Allardt
BY
J. P. Moran
ATTORNEY

Patented Mar. 23, 1954

2,673,276

UNITED STATES PATENT OFFICE 2,673,276

POST HEATING OF ELECTRICALLY WELDED TUBES IN LINE OF PRODUCTION

Ernst W. Allardt, Alliance, Ohio, assignor, by mesne assignments, to The Babcock & Wilcox Company, Jersey City, N. J., a corporation of New Jersey Application February 1, 1951, Serial No. 208,933

4 Claims. (Cl. 219—6)

This invention relates to the production of electrically welded tubes and, more particularly, to a method of and apparatus for normalizing such tubes in the line of production.

In the present manufacture of electrically welded tubes, a coil of strip steel is unwound and fed to a brush which cleans foreign material from the strip. The strip leaving the strip brush is fed through a slitter which trims the strip to the desired width for the size tube being manufactured. In a continuous operation, the trimmed strip is then fed through a forming mill which has a series of rolls which progressively bend the strip into the required tube shape and with the abutting edges of the strip properly positioned for welding. The thus formed tubing is fed from the forming mill through electric resistance welding apparatus generally comprising a pair of rotary welding electrodes engaging the tubing on each side of the longitudinal opening therein and squeeze rolls for forcing the tubing edges into engagement under pressure as they are heated by the flow of electric current thereacross. The welded tubing is then fed to suitable cut-off means which cuts the tubing into the desired lengths.

Following the cutting of the tubing, the individual tube lengths are heated, in a soaking pit or in a furnace, to a temperature approximately 100° F. above the critical temperature range, and are then allowed to cool to room or ambient temperature. This "normalizes" the tubing and assures that the welded seam will have substantially the same ductility as the remainder of the tube. This is important in the later sizing and shaping of the tubes, whereby the individual tubes are passed through a sizing and shaping mill which forms the tube to the required contour and required dimensions. If the tubes are not normalized, the higher hardness of the welded seam interferes with proper shaping and sizing of the tubes.

However, with the customary practice the entire tube is normalized, whereby the only part actually requiring such treatment is the welded seam. Consequently, an excessive amount of heating is required for such normalizing, which, in turn, increases the cost of the finished tubing. Additionally, the normalizing procedure increases the time required to finish the tubing.

In accordance with the present invention, such increased heating costs and increased production time are eliminated by normalizing the welded seam during the continuous production of the welded tubing and before the tubing has been sized, shaped and cut to length. Desirably, this is effected by rapidly and highly heating a narrow band along the tubing including the welded seam and a part of the tubing on either side of the seam for a predetermined time. This heating may be effected advantageously by means of inductive heating in which a high frequency electric current is induced in the areas adjacent and including the welded seam. The heated tubing is then passed through a cooling unit in which it is rapidly cooled to room temperature in a neutralizing controlled atmosphere.

With the invention method and apparatus, the tubing is normalized while passing along the production line immediately after formation of the welded seam and as part of the continuous operation. Thus, the residual heat from formation of the welded seam, is effectively utilized in the normalizing operation, reducing the amount of additional heat required to achieve the normalizing temperature. The continuous operation also includes, following the normalizing operation, the sizing and shaping of the continually moving length of tubing. As such continuous length of tubing leaves the sizing and shaping mill, it may be cut to length by suitable means such as a reciprocating rotary cut-off.

For an understanding of the invention principles, reference is made to the following description of a typical embodiment thereof, as illustrated in the accompanying drawings.

In the drawings:

Figs. 1, 1A, and 1B, when placed end to end, provide a side elevation view of continuous tube forming apparatus embodying the invention principles.

Fig. 2 is a side elevation view of a preferred form of induction heater used in the production line illustrated in Figs. 1, 1A, and 1B.

Figure 3:
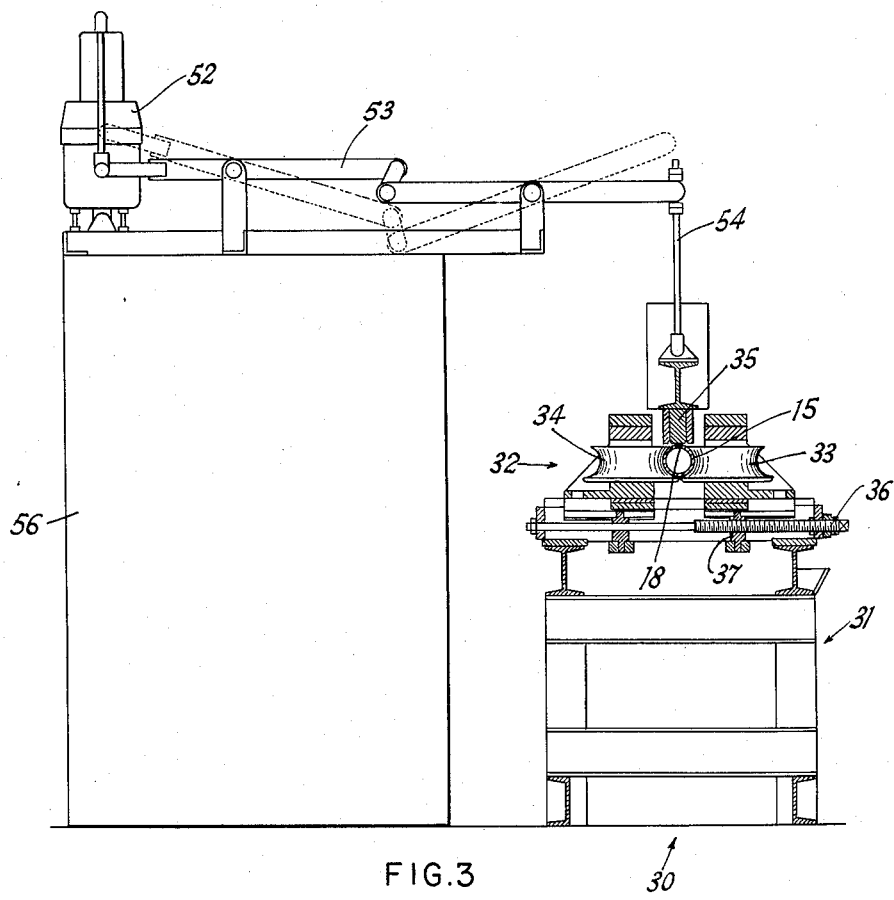
Fig. 3 is an end elevation view, partly in section, of the induction welder of Fig. 2.

When Figs. 1, 1A and 1B are joined on the lines C—C and D—D they illustrate, in side elevation, a continuous tube forming mill embodying the principles of the invention. It should be understood that, insofar as conventional elements of the tube mill are concerned, the illustration thereof is somewhat schematic and all of the mill stands have not been indicated, only certain ones being selected to illustrate the several functions.

Referring to these three figures, steel strip from a coil of strip is guided along a sloping ramp 11 into a roll stand 12, past a rotary brush 13 and through a roll stand 14. The rolls of stand 14 may be suitably power driven so that the strip 15 is pulled over the brush 13 which removes foreign material from the strip surfaces and cleans the same. The strip 15 then passes into a slitter, generally indicated at 16, and which may be of conventional construction. Slitter 16 cuts or trims the strip to the desired width for the particular size tubing to be formed, and the strip material trimmed from strip 15 is chopped up by a scrap chopper 17.

The cleaned and trimmed strip is continuously fed from slitter 16 to the forming mill generally indicated at 20. If desired, a large loop of strip may be formed between slitter 16 and forming mill 20 to allow for flexibility and any differences in the rates of feed of these two machines. In entering forming mill 20, the strip first passes through roll stand 21 which stencils the strip with any desired indicia. The strip enters the first stand 22 of mill 20 in substantially flat form and is gradually shaped by the intermediate stands 23, into a substantially cylindrical form, so that the strip leaving the final stand 24 of mill 20 has been bent into generally tubular form with its edges in abutting relation.

The continuously moving strip, now shaped into a tubular form, enters the seam welder indicated at 25. Welder 25, which is preferably an electric resistance seam welder, includes roll stands 26 which further shape the tubular strip and align the adjacent edges with rotary electrodes such as 27. These electrodes engage the edges of the strip and are connected in the secondary winding of a suitable welding transformer so that a heavy current flows between the electrodes across the tube edges. As the tube edges are highly heated by this relatively heavy current flow, they are forced into abutting relation by squeeze rolls 28 to form a resistance welded seam in the tubing. The welded tubing leaves welder 25 through a guiding roll stand 29.

In accordance with the present invention, the welded tubing is not cut to length as it leaves the welder 25 and then normalized, but the continuous welded tubing is passed immediately through suitable heating and cooling means so that the normalizing operation is performed as part of the continuous processing of the moving uninterrupted length of tubing. Such normalizing immediately following the welding conserves the residual welding heat to assist in raising the temperature to the normalizing value, thus reducing the heat input required for normalizing.

For this purpose a suitable inductive heater 30 is schematically indicated as mounted immediately adjacent the exit of welder 25 to receive the continuous moving tubing 15 as it emerges from the welder. Induction heater 30 applies a high frequency heating current to a relatively narrow band extending along tubing 15 and including the still hot welded seam and portions immediately adjacent either side thereof. This relatively narrow band is highly heated by the high frequency currents induced therein by heater 30 to a temperature held desirably about 100° above the critical range of the material of tube 15 for a predetermined time. Only this relatively narrow segmental band is thus heated and not the entire tube. The tube 15, still moving as a continuous member, passes from inductive heater 30 into a cooling chamber unit 40 in which a controlled atmosphere, preferably neutralizing, is maintained through the medium of a duct 41. As the tubing 15 passes through chamber 40, the highly heated narrow band along the welded seam is rapidly cooled to room temperature, completing the normalizing of this band so that the welded seam has substantially the same ductility as the remainder of the walls of the tubing.

The still uncut tubing 15 leaving chamber 40 passes through a sizing mill 45 having roll stands, as indicated at 46 and 47, which shape the tubing to the desired contour and desired size. For example, the tubing emerging from sizing mill 45 may be circular, elliptical, rectangular, or tear drop shape (stream-lined). The normalized, sized, and shaped continuous length of tubing emerging from mill 45 is then cut into any desired length by suitable means such as the schematically indicated reciprocable rotary shears 50. Typically, such shears are engaged with the tubing and driven along with the same while making a cut and are then rapidly returned to the starting point for making a new cut. The cut lengths of tubing are fed onto a roll-out table illustrated at 51.

In the preceding description no particular reference has been made to certain well known details of construction and components of the several machines of the tube forming line. For example, the welder 25 may include inside and outside bead trimmers which remove excess weld metal from the inner and outer surfaces of the tube, and the forming mill 20 usually includes horizontal roll stands as well as the vertical roll stands illustrated. As such details form no part of the present invention, specific illustration has not been deemed necessary.

However, in order to give an understanding of the rapid post heating of the welded seam, a typical induction heater is shown in Figs. 2 and 3, it being understood that other forms of inductive heaters may be used if designed to heat only a narrow band extending along the welded seam of the tube.

The induction heater 30, as shown in Figs. 2 and 3, includes a structural framework support, generally indicated at 31, on which are supported vertical roll stands, such as 32, which receive the continuous length of tubing 15 from the welder 25. One roll 23 of each stand is made laterally adjustable relative to the other roll 34 as by means of a threaded shaft 36 extending through depending arm 37 forming part of the support for roller 33.

Rolls 33 and 34 are spaced to receive a relatively narrow elongated inductor 35 arranged in alignment with the welded seam 18 in tubing 15. Inductor 35 extends a short distance on either side of seam 18, so that, not only is the seam heated by the inductor, but also a narrow strip on either side of the seam 18.

The support and control arrangement for inductor 35 includes a supporting structure 56 on top of which are thrusters 52 which are connected, through linkages generally indicated at 53, to rods 54 connected to the inductors 35. Electric power for the inductors is supplied from units 55, such power being of relatively high frequency, as is well known to those skilled in the art of inductive heating. In the particular inductive heater illustrated, two inductors 35 with their associated thrusters and linkage are provided in tandem with each other along the line of continuously moving tubing 15.

As stated, the induction heater 30 heats the moving tubing progressively to a temperature approximately 100° above the critical range of the strip steel holding this temperature for a predetermined time, and the thus heated tubing, or more particularly a narrow band extending therealong and including the welded seam, is then cooled by unit 40 to room temperature, preferably in a controlled neutralizing atmosphere.

While a specific embodiment of the invention has been shown and described in detail to illustrate the application of the invention principles, it should be understood that the invention may be embodied otherwise without departing from such principles.

I claim:

1. In the method of continuously producing electrically welded tubing from a continuous length of strip steel involving the progressive weld uniting of the edges of formed tubular strip to provide a continuous length of electrically welded tubing, sizing and shaping the welded tubing, and then cutting the sized and shaped tubing into lengths; the improvement comprising progressively heating the continuous length of tubing, immediately after the formation of the welded seam therein and while the welded seam has substantial residual heat therein, and before sizing and shaping the tubing to a temperature substantially 100° F. above the critical range of the steel strip; immediately thereafter progressively rapidly cooling the thus heated continuous tubing to ambient temperature while passing the continuous tubing through a controlled neutralizing atmosphere; following such cooling progressively sizing and shaping the thus normalized continuous length of tubing; and thereafter cutting the tubing into preselected lengths.

2. In the method of continuously producing electrically welded tubing from a continuous length of strip steel involving the progressive weld uniting of the edges of formed tubular strip to provide a continuous length of electrically welded tubing, sizing and shaping the welded tubing, and then cutting the sized and shaped tubing into lengths; the improvement comprising progressively heating, by electric induction heating, a narrow band, including the welded seam, along the continuous length of tubing, immediately after the formation of the welded seam therein, and before sizing and shaping the tubing to a temperature substantially 100° F. above the critical range of the steel strip; immediately thereafter progressively rapidly cooling the thus heated continuous band to ambient temperature while passing the continuous tubing through a controlled neutralizing atmosphere; following such cooling, progressively sizing and shaping the thus normalized continuous length of tubing; and thereafter cutting the tubing into preselected lengths.

3. A production line for producing electrically welded tubing from a continuous length of strip steel comprising, in combination, a forming mill arranged to progressively shape the moving continuous steel strip into a continuous length of tubing; a resistance seam welder arranged to receive the continuous tubing from the forming mill to form a welded seam between the edges of the tubing; cut-off means for cutting the continuous tubing into pre-selected lengths; an electric induction heater interposed between the seam welder and the cut-off means and operable to heat a narrow band including the welded seam along the continuously moving tubing to a temperature substantially 100° F. above the critical range of the steel strip; a cooling chamber immediately following the heater for progressively rapidly cooling the thus heated continuous tubing to ambient temperature; means providing a controlled neutralizing atmosphere in said cooling chamber; and a sizing mill between said cooling chamber and said cut-off means for shaping and sizing the thus normalized tubing.

4. In apparatus for continuously producing electrically welded tubing from continuous lengths of strip steel in which the formed strip steel passes successively through an electric resistance seam welder for forming a welded seam uniting the tube edges to close the seam, tube sizing and shaping means, and cut-off means for cutting the continuous tubing into pre-selected lengths; the combination of an electric induction heater interposed between the seam welder and the cut-off means and operable to heat the continuously moving tubing to a temperature substantially above the critical range of the steel strip; and a cooling chamber immediately following the heater and in advance of the sizing and shaping means for progressively rapidly cooling the thus heated continuous tubing to ambient temperature.

ERNST W. ALLARDT.

References Cited in the file of this patent

UNITED STATES PATENTS

| Number | Name | Date |
|---|---|---|
| 1,893,926 | Anderson | Jan. 10, 1933 |
| 2,047,254 | Burnish | July 14, 1936 |
| 2,265,129 | Darner | Dec. 9, 1941 |
| 2,460,687 | Fuchs | Feb. 1, 1949 |
| 2,464,402 | Kentis, Jr. | Mar. 15, 1949 |
| 2,475,348 | Black | July 5, 1949 |